United States Patent
Miyajima et al.

(10) Patent No.: US 7,102,319 B2
(45) Date of Patent: Sep. 5, 2006

(54) SYNCHRONOUS MOTOR AND A ROTATION CONTROL METHOD THEREOF, AS WELL AS, AN INVERTER FOR USE OF THE SYNCHRONOUS MOTOR

(75) Inventors: Hisayuki Miyajima, Ueda (JP); Shigenori Miyairi, Ueda (JP); Mutsuo Tokashiki, Sakura (JP); Hiroshi Watanabe, Sakura (JP)

(73) Assignees: Hitachi Industrial Equipment Systems Co., Ltd., Narashino (JP); Sanyo Denki Co., Ltd., Tokyo (JP)

( * ) Notice: Subject to any disclaimer, the term of this patent is extended or adjusted under 35 U.S.C. 154(b) by 147 days.

(21) Appl. No.: 10/954,076

(22) Filed: Sep. 30, 2004

(65) Prior Publication Data
US 2005/0104550 A1 May 19, 2005

(30) Foreign Application Priority Data
Nov. 5, 2003 (JP) ............................ 2003-375607

(51) Int. Cl.
H02P 1/46 (2006.01)
(52) U.S. Cl. .................. 318/718; 318/700; 318/801; 318/432; 318/434
(58) Field of Classification Search ............. 318/718, 318/700, 801, 432, 434, 727, 807, 827; 310/166
See application file for complete search history.

(56) References Cited

U.S. PATENT DOCUMENTS 6,700,272 B1 * 3/2004 Lindner ..................... 310/166

2001/0022507 A1 * 9/2001 Marinus et al. ............. 318/727

FOREIGN PATENT DOCUMENTS

JP  57-180395  11/1982
JP  1-14775    4/1989

* cited by examiner

*Primary Examiner*—Karen Masih
(74) *Attorney, Agent, or Firm*—Antonelli, Terry, Stout and Kraus, LLP.

(57) ABSTRACT

A rotation control method of a synchronous motor, the motor comprising: a stator having AC windings thereround; and a rotor, being mounted within said stator, rotatably, wherein on an each surface, opposing to the rotor, of poles building up the stator, are formed plural numbers of teeth portions, and on a surface of the rotor, being made of permanent magnet, opposing to the poles of the stator, are also formed plural numbers of teeth portions, with a width being nearly equal to that of the teeth portion in a circumference direction thereof, and further AC voltages having a predetermined voltage-frequency characteristic is supplied to AC windings wound around the poles of the stator, and the AC voltages supplied from the inverter is so determined in the voltage-frequency characteristic thereof, at least within a part of frequency band equal or less than a predetermined rated frequency, a pull-out torque of the synchronous motor is equal to or greater that a rated pull-out torque at the predetermined rated frequency, thereby providing a synchronous motor and also an inverter to be used for such the synchronous motor, but hardly causing the step-out phenomenon in the operating condition when accelerating and decelerating the synchronous motor.

41 Claims, 10 Drawing Sheets

SYNCHRONOUS MOTOR AND A ROTATION CONTROL METHOD THEREOF, AS WELL AS, AN INVERTER FOR USE OF THE SYNCHRONOUS MOTOR

BACKGROUND OF THE INVENTION

The present invention relates to a synchronous motor having a rotor, which is rotatably mounted within a stator having AC (alternating current) windings wound therearound, and a rotation control method thereof, as well as, an inverter for use of such the synchronous motor, and in particular, it relates to a synchronous motor and a rotation control method, in which plural numbers of teeth portions are formed, not only upon a surfaces of each of poles building up said stator, but also upon a surface of said rotor opposing to those poles, respectively, and thereby enabling to obtain a desired characteristic through applying AC voltage thereto from an inverter, as well as, the inverter for use in such the synchronous motor.

Conventionally, when driving a pump and/or a fan, rotationally, as a load thereon, as was already known in the following Patent Document 1, etc., for example, a cryopump driving apparatus is widely used, which is built up with a driving apparatus having a synchronous motor therein, for rotationally driving the load, such as, a refrigerator of a cryopump, etc. And, with such the conventional art, for driving the synchronous motor mentioned above with using a commercial electric power source of frequency 50 Hz, it was already known to conduct the frequency conversion on the frequency of the electric power with using a frequency converter (i.e., an inverter), thereby to drive the synchronous motor with a desired frequency.

On the other hand, as a synchronous motor for general uses or purposes, i.e., being a kind of an AC electric machine, as well as, a rotor having windings wound thereround or that being made of permanent magnet, in the structure thereof, there was already known a synchronous motor, of so-called a type of multi-pole structure, adopting a rotor of applying a permanent magnet(s) in a part thereof, upon the surface of which are formed plural numbers of gutters; i.e., teeth portions, in a direction of the rotating axis thereof. Though such the structure of the rotor, having the teeth portions formed thereround, was also applied, widely, in such as, so-called a stepping motor; however, due to discovery of magnets of the rare-earth elements (for example, neodymium, samarium, cobalt, etc.) having high antimagnetic force, in recent years, it is possible for the motor to obtain a higher torque therefrom, in spite of the same structure or sizes thereof, and also to manufacture it with relatively a large amount thereof, but cheaply; therefore, being widely applied therein.

In addition thereto, for an induction electric machine or motor, there are also known various apparatuses, such as, a voltage controller apparatus for an inverter, in which the inverter built up with a transistor bridge or the like is controlled, so as to obtain an improvement on the characteristics thereof when the motor rotates at a low speed, for example, in the Patent Document 2 which will be listed up below, etc. Namely, with such the conventional technology as was mentioned above, within the control method of maintaining V/F ratio ($=\phi$) constant for satisfying a rated load, in general, and in particular for dissolving shortage of the torque generated from the motor when it rotates at a low speed, the V/F ratio is increased when a frequency is lowered, normally, and at the same time, adjustment is made on terminal voltage of the induction motor in relation with torque of the load, fitting to the characteristic of the load, thereby providing a voltage controller apparatus for the inverter fitting to the load characteristics.

Patent Document 1: Japanese Utility-Model Publication No. Hei 1-14775 (1989); and Patent Document 2: Japanese Patent Laying-Open No. Sho 57-180395 (1982).

However, in a case when controlling the voltage to be supplied into the induction motor and/or the general-use synchronous motor with using a normal inverter, as was mentioned in the above, however in general, the control method of V/F ratio ($=\phi$) constant is mainly used for the purpose of satisfying the rated load. However, in particular, as was mentioned above, in the case when controlling AC supply voltages for driving the synchronous motor having such the structure, i.e., while forming the plural numbers of teeth portions on the surfaces of the stator poles in the direction of rotation axis thereof, adopting the rotor made of using the permanent magnet in a part thereof, which also forms the plural numbers of teeth portions on the surface thereof in the direction of rotation axis thereof, it is not always possible to obtain sufficient characteristics or performances therefrom. However, this can be considered resulting from the fact that, in particular, the above-mentioned voltage control of applying the inverter therein is mainly achieved for controlling the supply voltages to the induction motor and the synchronous motor, and therefore, it is not always fitting to such the structure of the motor mentioned above, too.

BRIEF SUMMARY OF THE INVENTION

Then, according to the present invention, achieved by making various experiments and studies upon the characteristics or performances of the AC motor having such the structure mentioned above, in particular, the synchronous motor; i.e., the plural numbers of teeth portions are formed on each surface of the poles building up the stator, and also the plural numbers of teeth portions are formed on the opposing surface of the rotor, which is mounted therein rotatably, so that it is driven with supplying driving voltage, having a predetermined voltage-frequency characteristic, into the AC windings of the stator thereof, and as a result thereof, therefore an object thereof is to provide a new method for controlling the voltages supplied to the said synchronous motor through the inverter, upon the basis of the peculiar characteristics obtained from the said synchronous motor, and further, a synchronous motor enabling to obtain a superior characteristics or performances with using such the control method and also an inverter for use thereof.

In particular, with the various experiments made by the present inventors upon such the synchronous motor mentioned above, it is possible to obtain the predetermined characteristics or performances even when supplying the predetermined AC voltages in accordance with an inverter characteristic, which is applied in the induction motor, in general; i.e., the control method of V/F ratio ($=\phi$) constant while passing through the origin (point). However, with such the method of V/F ratio ($=\phi$) constant, the torque generated from the motor comes down to be low, due to the restriction influencing upon the voltages, in particular, when accelerating or decelerating the motor, and there are also some cases where the motor results into so-called step-out in the operation condition thereof, because the performance of such the rated torque cannot be obtained therefrom. Also, according to the experiments, it is apparent that even if applying the voltage exceeding the control of V/F ratio ($=\phi$)

constant mentioned above within a wide range of frequency of the electric power source, there occurs no burnout within primary coils, accompanying with an excessive increase of the primary current, which is generated in the normal synchronous machine and the induction machine; therefore, it is possible to rise up the primary current, and further, rather due to this, a sufficient pull-out torque can be obtained therefrom.

On the other hand, with such the synchronous motor mentioned above, there can easily occur the phenomenon of so-called the step-out, which is not necessity to be taken into the consideration for the general-use synchronous motor, in general. In addition thereto, it is also acknowledged that the step-out phenomenon will occur when accelerating or decelerating the motor, abruptly.

Then, according to the present invention, upon the basis of such new recognition or acknowledgement obtained by the present inventors, as was mentioned above, an object thereof is to provide a synchronous motor and a rotation control method thereof, and also an inverter to be used for such the synchronous motor, in particular, in such the synchronous motor, forming plural numbers of teeth portions on each surface of the poles building up a stator, also forming plural numbers of teeth portions upon the opposing surface of a rotor, which is mounted therein rotatably, thereby being driven with supplying driving voltages of a predetermined voltage-frequency characteristic to AC windings of the stator by means of an inverter, but hardly causing the step-out phenomenon in the operating condition thereof, and additionally, hardly causing that step-out phenomenon also when accelerating and decelerating that synchronous motor.

According to the present invention, for accomplishing the object mentioned above, there is provided a rotation control method of a synchronous motor, said motor comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further AC voltages having a predetermined voltage-frequency characteristic is supplied to AC windings wound around the poles of said stator, and the AC voltages supplied from said inverter is so determined in the voltage-frequency characteristic thereof, at least within a part of frequency band equal or less than a predetermined rated frequency, a pull-out torque of said synchronous motor is equal to or greater that a rated pull-out torque at said predetermined rated frequency.

Also, according to the present invention, in the rotation control method of a synchronous motor as described in the above, preferably, the voltage-frequency characteristic of the AC voltages supplied from said inverter is so set up that, the frequency band where said pull-out torque equal is equal or greater than the rated pull-out torque at said rated frequency occupies an area, being equal or greater than 20%, at least, on a total area of frequency, being lower than said rated frequency, including said rated frequency therein.

Also, according to the present invention, in the rotation control method of a synchronous motor as described in the above, preferably, the voltage-frequency characteristic of the AC voltages supplied from said inverter is, further, in proportion between said voltage and said frequency thereof, within the frequency band being equal or less than the predetermined rated frequency.

Further according to the present invention, for accomplishing the object mentioned above, there is also provided a rotation control method of a synchronous motor, said motor comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further AC voltages having a predetermined voltage-frequency characteristic is supplied to AC windings wound around the poles of said stator, and the AC voltages supplied from said inverter is increased in voltage thereof when accelerating or decelerating said synchronous motor.

Also, according to the present invention, in the rotation control method of a synchronous motor as described in the above, preferably, the accelerating or decelerating of said synchronous motor is detected upon basis of changing of the frequency in said inverter.

Furthermore, according to the present invention, for accomplishing the object mentioned above, there is also provided a rotation control method of a synchronous motor, said motor comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further AC voltages having a predetermined voltage-frequency characteristic is supplied to AC windings wound around the poles of said stator, and the AC voltages supplied from said inverter is increased in voltage thereof when increasing current supplied to synchronous motor.

Further, according to the present invention, in the rotation control method of a synchronous motor as described in the above, preferably, the teeth portions formed on the surface of said rotor of said synchronous motor are skewed.

Also, according to the present invention, the rotation control method of a synchronous motor as described in the above, preferably, the teeth portions formed on the surface of said rotor of said synchronous motor are from 36 to 200 in numbers thereof.

Furthermore, according to the present invention, in the rotation control method of a synchronous motor as described in the above, preferably, said synchronous motor is a three (3)-phases synchronous motor.

Moreover, according to the present invention, for accomplishing the object mentioned above, there is also provided a synchronous motor, comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further comprising: an inverter for supplying AC voltages to AC windings wound around the poles of said stator, wherein the AC voltages supplied from said inverter is so determined in the voltage-frequency characteristic thereof, at least within a part of frequency band equal or less than a predetermined rated frequency, a pull-out torque of said synchronous motor is equal to or greater that a rated pull-out torque at said predetermined rated frequency.

And further, according to the present invention, for accomplishing the object mentioned above, there is also provided a synchronous motor, comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further comprising: an inverter for supplying AC voltages to AC windings wound around the poles of said stator, wherein the AC voltages supplied from said inverter is increased in voltage thereof when accelerating or decelerating said synchronous motor.

Also further, according to the present invention, for accomplishing the object mentioned above, there is also provided a synchronous motor, comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further comprising: an inverter for supplying AC voltages to AC windings wound around the poles of said stator, wherein the AC voltages supplied from said inverter is increased in voltage thereof when increasing current supplied to synchronous motor.

And, according to the present invention, in the synchronous motor as described in the above, preferably, the teeth portions formed on the surface of said rotor of said synchronous motor are skewed.

And also, according to the present invention, in the synchronous motor as described in the above, preferably, the teeth portions formed on the surface of said rotor of said synchronous motor are from 36 to 200 in numbers thereof.

Further, also according to the present invention, in the synchronous motor as described in the above, preferably, said synchronous motor is a three(3)-phases synchronous motor.

And, further according to the present invention, for accomplishing the object mentioned above, there is also provided an inverter for use of the synchronous motor, for supplying AC voltages to poles of a stator within said synchronous motor, said motor comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and within said inverter, the AC voltages supplied from said inverter is so determined in the voltage-frequency characteristic thereof, at least within a part of frequency band equal or less than a predetermined rated frequency, a pull-out torque of said synchronous motor is equal to or greater that a rated pull-out torque at said predetermined rated frequency.

Also, according to the present invention, in the inverter for use of the synchronous motor as described in the above, preferably, the voltage-frequency characteristic of the AC voltages supplied from said inverter is so set up that, the frequency band where said pull-out torque equal is equal or greater than the rated pull-out torque at said rated frequency occupies an area, being equal or greater than 20%, at least, on a total area of frequency, being lower than said rated frequency, including said rated frequency therein.

Also, according to the present invention, in the inverter for use of the synchronous motor as described in the above, preferably, the voltage-frequency characteristic of the AC voltages supplied from said inverter is, further, in proportion between said voltage and said frequency thereof, within the frequency band being equal or less than the predetermined rated frequency.

Furthermore, according to the present invention, for accomplishing the object mentioned above, there is also provided an inverter for use of the synchronous motor, for supplying AC voltages to poles of a stator within said synchronous motor, said motor comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and within said inverter, the AC voltages supplied from said inverter is increased in voltage thereof when accelerating or decelerating said synchronous motor.

And further, according to the present invention, also for accomplishing the object mentioned above, there is further provided an inverter for use of the synchronous motor, for supplying AC voltages to poles of a stator within said synchronous motor, said motor comprising: a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and within said inverter, the AC voltages supplied from said inverter is increased in voltage thereof when increasing current supplied to synchronous motor.

And, according to the present invention, in the inverter for use of the synchronous motor as described in the above, preferably, the teeth portions formed on the surface of said rotor of said synchronous motor are skewed.

And also, according to the present invention, in the inverter for use of the synchronous motor as described in the above, preferably, the teeth portions formed on the surface of said rotor of said synchronous motor are from 36 to 200 in numbers thereof.

And also, according to the present invention, in the inverter for use of the synchronous motor as described in the above, preferably, said synchronous motor is a three(3)-phases synchronous motor.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
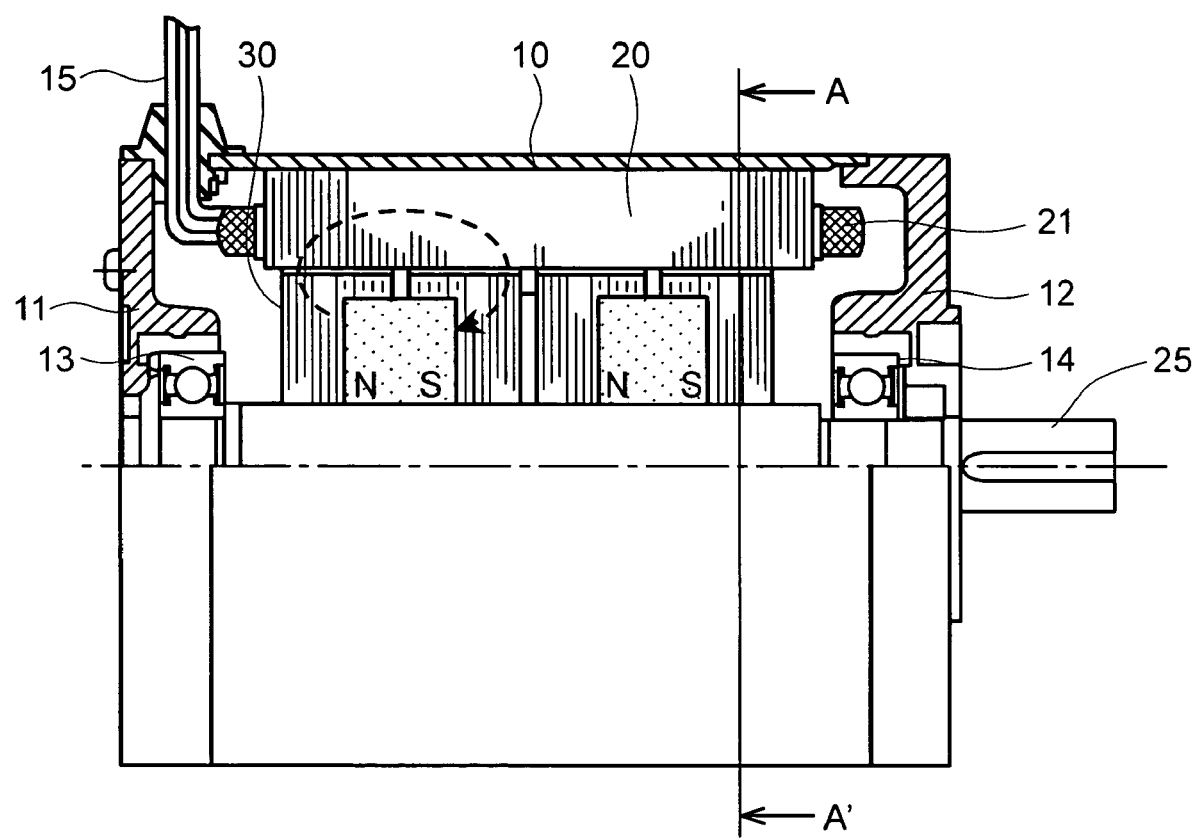
FIG. 1 is a cross-section view in direction of rotation axis thereof, for showing the entire structure of a three(3)-phases synchronous motor, according to one embodiment of the present invention.

First of all, FIG. 1 attached herewith is a cross-section view (the cross-section along with the axial direction thereof) for showing the entire structure of a three(3)-phases synchronous motor, according to the present invention.

In this FIG. 1, a reference numeral 10 depicts a housing made of a metal, such as, iron, for example, being formed into a cylindrical shape, and within an inside thereof is attached a stator 20, which is made from laminating plural numbers of silicon steels, each being cut out in a predetermined shape thereof. Also, a reference numeral 21 in the figure depicts windings; each being wound around plural numbers of magnetic poles formed in the stator 20, though it will be also explained in the later. And, within a cylinder-like space defined inside the stator, there is attached a rotor 30 being about cylinder-like in an outer configuration thereof, in a rotatable manner, through a pair of ball-bearings 13 and 14, each of which is attached at a central portion of end-brackets 11 and 12. Also, a reference numeral 25 depicts an output shaft, which is inserted into, locating at a center of the stator 20, and a reference numeral 15 lead wires for supplying three(3)-phases AC power to the three-phases synchronous motor.

Figure 2:
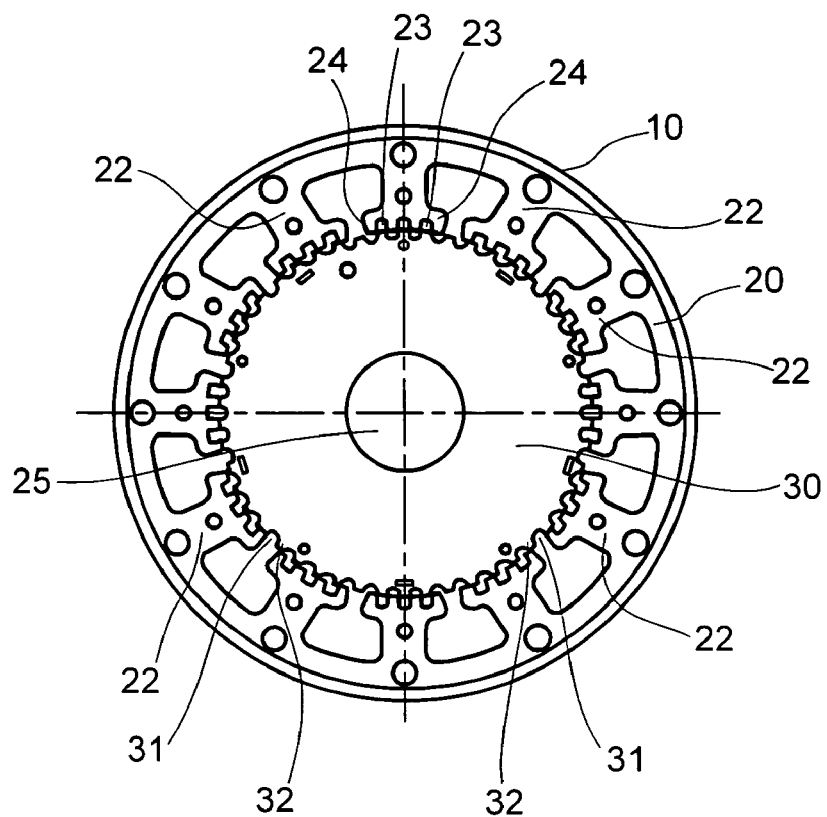
FIG. 2 is A–A' cross-section view in the above FIG. 1, for showing the entire structure of the three-phases synchronous motor mentioned above.
Figure 4A:
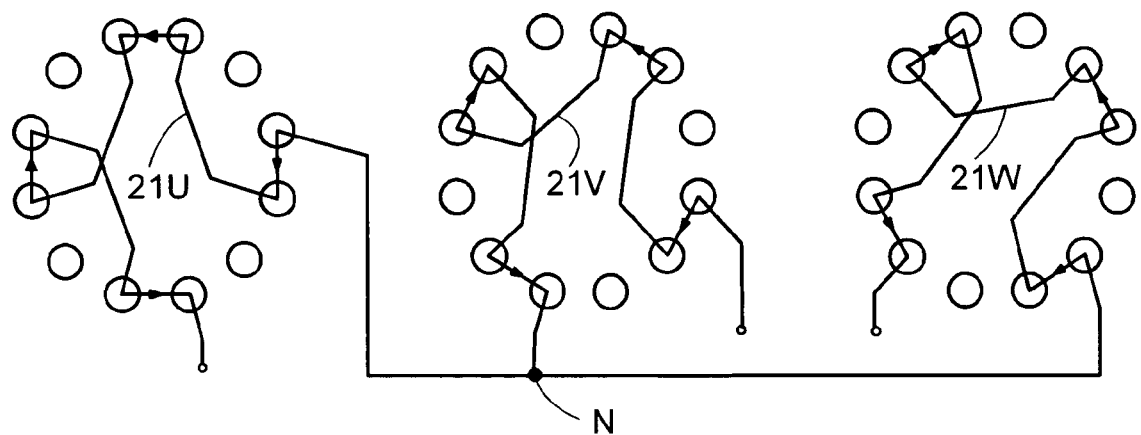
FIGS. 4(a) and 4(b) are views for showing the winding method of three-phases AC windings on a stator of the synchronous motor, according to the present invention.
Figure 4B:
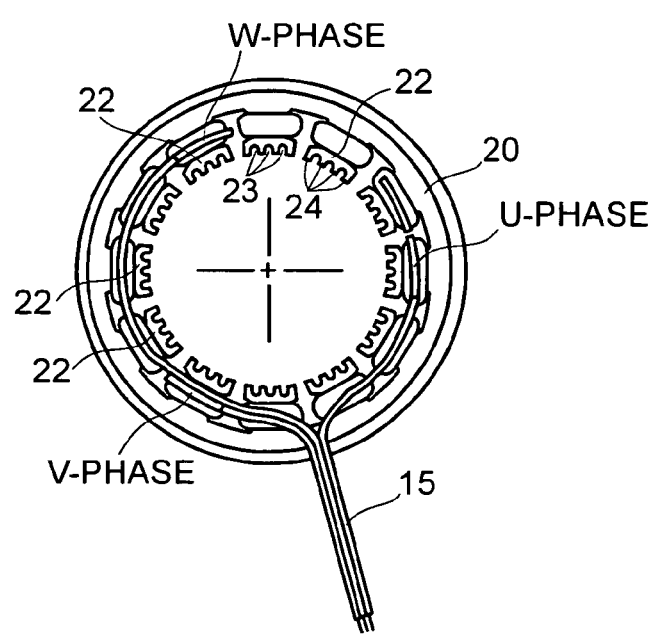

Next, FIG. 2 attached herewith shows the cross-section of the three-phases synchronous motor mentioned above, and in particular, at a portion indicated by arrows A—A' in the above FIG. 1. Namely, as is apparent from this cross-section view, on a side of the stator 20 of the three-phases synchronous motor are formed all the magnetic poles (i.e., stator poles) 22, 22 . . . , of twelve (12) pieces, and in periphery of those magnetic poles 22, 22 . . . (i.e., slots formed between them) are wound three(3)-phases AC windings 21U, 21V and 21W, respectively, in accordance with the connection method shown in FIG. 4(a) attached herewith. Thus, in FIG. 4(a) attached herewith is shown the three-phases AC windings wound around the twelve (12) pieces of magnetic poles 22, 22 . . . mentioned above, in the form of circuit diagram thereof, and in FIG. 4(b) is shown the cross-section structure of the stator 20, including the windings thereof. Further, a reference mark "N" in the figures depicts a neutral point of the winding, while the reference numeral 15 depicts the lead wires of 3-phases, and further a mark "U" depicts a lead wire of "U"-phase, "V" a lead wire of "V"-phase and "W" a lead wire of "W"-phase, respectively.

Also, as is apparent from those FIGS. 2 and 4(b) mentioned above, on a surface of each of the magnetic poles of the three-phases synchronous motor (i.e., the surface opposing to the rotor 30 mentioned above), there are formed three(3) pieces of gutters 23, 23 . . . , respectively, in a direction of rotation axis thereof, and thereby forming four (4) pieces of teeth portions 24, 24 . . . on the surface of the respective magnetic poles, respectively.

Figure 3:
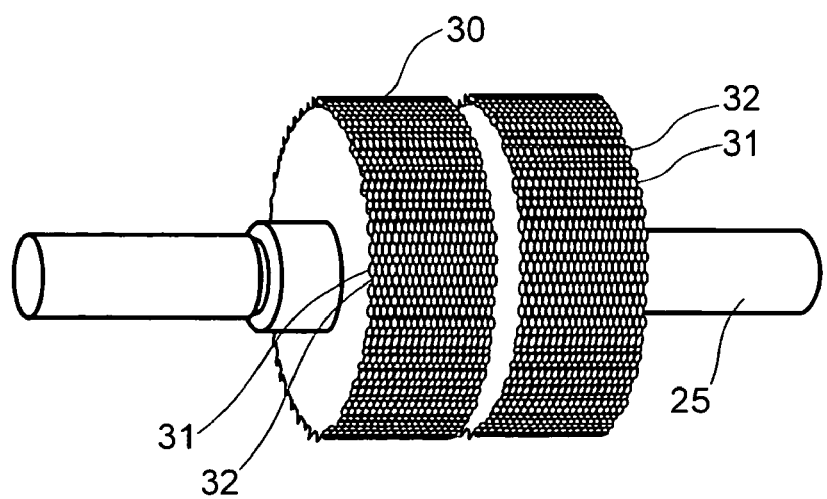
FIG. 3 is a perspective view for showing an example of the structure of a rotor in the three-phases synchronous motor mentioned above.

On the other hand, the rotor 30 mentioned above is formed to be about cylinder-like in an outer configuration thereof, as is shown in FIG. 3 attached herewith for showing an outer-look thereof, and on an outer peripheral surface thereof, there are also formed plural numbers of gutters 31, 31 . . . along with the direction of rotation axis thereof, and thereby forming plural numbers of teeth portions 32, 32 . . . on the outer peripheral surface thereof. However, the rotor 30 has the structure, such as, of being so-called "hybrid", and as is apparent from the cross-section shown in FIG. 1 mentioned above, it is also made up with silicon steels, each being punched out in a predetermined shape thereof, while disposing therein a permanent magnets 33 of a cylindrical shape, directing the magnetic poles thereof (i.e., N-pole and S-pole) into the direction of that rotation axis, and laminating the silicon steels thereround. Although the rotor 30 shown in this FIG. 3 has the structure, in which the laminated silicon steels are attached around the one (1) piece of the permanent magnet 33, in particular, in a front and a rear thereof; however, on the other hand, the structure of the rotor 30 shown in FIG. 1 mentioned above shows the rotor, such as, of so-called multi-stages, i.e.; a unitary structure mentioned above is connected in plural numbers of stages, in more details, two (2) stages, for example, in the direction of rotation axis thereof. Further, the number of the stages of the rotor 30 should be determined, appropriately, within a range from one (1) to four (4), in normal, by taking required output characteristics into the consideration thereof.

Namely, with the rotor 30 having such the hybrid structure, as is indicted by an arrow of broken line in the FIG. 1 mentioned above, it is possible to form a magnetic path or circuit directing from the front to the rear, in the direction of rotation axis thereof. Further, in FIG. 3 mentioned above, the teeth portions 32, 32 . . . , which are formed in the outer peripheral surface of the rotor 30 in the front and the rear thereof, respectively, they are shifted to each other by a half (½) pitch thereof. Thus, the portion making up the teeth portion 32 in the front is formed to be the groove 31 on the rear side thereof. And, according to the present embodiment, the number of the teeth portions 32, 32 . . . (or, the grooves 31, 31 . . . ) formed on the outer peripheral surface of the rotor 30, including those formed in the front and the rear, comes up to about 36 through 200 pieces, in total number thereof. Also, preferably, if those teeth portions 32 (or the grooves 31) are formed, inclining at a very small angle; i.e., in the so-called skewed structure, and then it is possible to obtain a smooth output toque, in particular, reducing cogging occurring therein. Further, the teeth portion 32 or the groove 31 may be formed to be rectangular, circular or elliptic, in the cross-section shape thereof.

Further, with the relationship between the teeth portions 24, 24 . . . formed on the side of the stator 20 and the teeth portions 32, 32 . . . formed on the side of the rotor 30 is, as shown in the FIG. 2 mentioned above, each of those is formed with a similar size thereof, respectively, and they are formed with shifting to each other, by ½ pitch within a quarter (¼) round (i.e., 90 degree) on the periphery thereof.

Next, explanation will be given on a control method, for enabling to obtain sufficient pull-out torque within the three-phases synchronous motor mentioned above, which was proposed upon the basis of a result from various experiments made by the present inventors, by referring to FIGS. 5 to 7.

Figure 5:
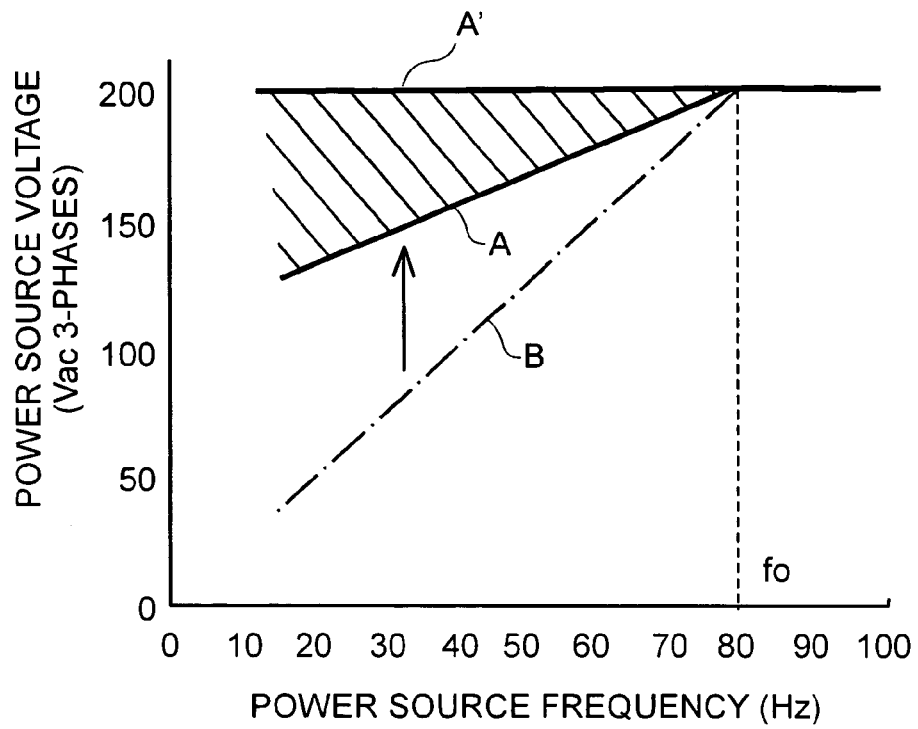
FIGS. 5(a) and 5(b) are graphs for showing a voltage-frequency characteristic curve and a pull-out torque characteristic curve, for explaining a rotation control method of the synchronous motor, according to the present invention.
Figure 5:
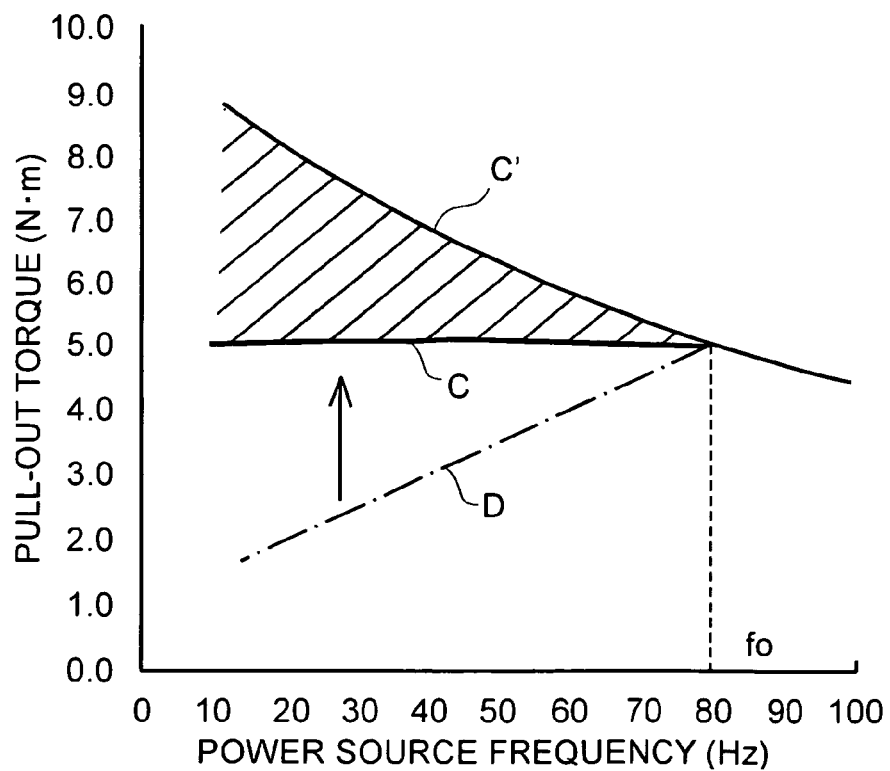

First of all, in graphs shown in FIGS. 5(*a*) and 5(*b*), the horizontal axis depicts the frequency of the AC voltages, so-called, a power supply frequency (Hz), being supplied to the 3-phase AC windings 21U, 21V and 21W, which are wound around twelve (12) pieces of magnetic poles (i.e., stator poles) building up the stator 20, within the three-phases synchronous motor mentioned above. On the other hand, in the graph shown in FIG. 5(*a*), the vertical axis thereof depicts electric power voltage of the AC voltages (so-called, the voltage-frequency characteristic), which are supplied to the AC windings 21U, 21V and 21W, while in the graph shown in FIG. 5(*b*), the vertical axis thereof depicts the pull-out torque (N·m) obtained therefrom, respectively. Also, in this example, a rated frequency ($f_0$) is set at 80 Hz, for example, and the pull-out torque at that time is called by a "rated pull-out torque", hereinafter.

In those graphs mentioned above, first the AC synchronous motor is driven in accordance with the voltage-frequency characteristic, being increased in proportion to an increase of the frequency, and also being shifted upward as the entire thereof (see an arrow in the figure), as is shown by a solid line "A"; i.e., within an area or region where the frequency is equal or greater than the rated frequency, the power voltage is maintained at a constant (i.e., the rated voltage), and within an area where the frequency is equal or less than that rated frequency "$f_0$" an inclination angle of the characteristic curve is made small. Further, in this graph, there is shown a characteristic curve, which is obtained through the control method of V/F ratio (=φ) constant mentioned above, in general, for the consideration thereof, by a one-dotted broken line. As a result thereof, as is shown by a solid line "C" in FIG. 5(*b*), the pull-out torque obtained has a value, being larger than the rated pull-out torque in the area or region where the frequency is equal or less than the rated frequency. Furthermore, in this graph, there is also shown the pull-out torque obtained through the control method of V/F ratio (=φ) constant, as is indicated by a solid line "D", for the consideration thereof. However, in this instance, there occurs no burning in the primary windings accompanying with the excessive increase of the primary current flowing therein. And, as a result thereof, it is possible to obtain the sufficient pull-out torque within a wide area or region of the electric power frequency, in particular, within the entire area of being equal or less than the rated frequency "$f_0$". In other words, it is possible to obtain a stable characteristic of rotation speed, but without step-out, within a wide area of rotation speed thereof.

Further, in the graph shown in FIG. 5(*a*) mentioned above, a solid line "A'" depicts a result where the power voltage is further shifted upward within the area where the frequency is equal or less than the rated frequency "$f_0$", as was mentioned above, and rather it is made about constant (i.e., at the rated voltage) irrespective of the frequency. And, the pull-out torque obtained at that time is depicted by a solid line "C'" in the FIG. 5(*b*). Thus, it is apparent that, the more pull-out torque can be obtained, the more shifting the solid line "A" mentioned above upward. With this, it is possible to set up or determine the pull-out toque characteristic to be within an area defined between the solid lines C—C', as indicated by the hatched oblique lines within the FIG. 5(*b*), through setting up or establishing the frequency-voltage characteristic of the electric power source, appropriately, within the area defined between the solid lines A—A', as indicated by the hatched oblique lines within the FIG. 5(*a*). Namely, it is apparent that set-up can be made, so that a large pull-out torque being larger than the rated pull-out torque can be maintained, even within the area where the frequency is equal or less that the rated frequency "$f_0$".

Though in the above is shown the method of shifting the voltage-frequency characteristic upward while making the inclination angle of the characteristic curve small, according to the present invention, however, the present invention should not be restricted only to this. For example, as shown in FIGS. 6(*a*) and 6(*b*) attached herewith, with shifting the general voltage-frequency characteristic "B" up to a low frequency "f" within the area where the frequency is equal or less than the rated frequency "$f_0$" (see an arrow in the figure), it is also possible to make such the set-up, that the large pull-out torque being larger than the rated pull-out torque can be maintained, even within the area where the frequency is equal or less that the rated frequency "$f_0$", in the similar manner as was mentioned above. Also, as is shown in FIG. 7(*a*) attached herewith, by combining a general voltage-frequency characteristic "B" together with plural numbers of lines (or, curves), each being different in the inclination angle thereof, it is possible to obtain the pull-out torque, which is equal to the rated pull-out torque, up to a desired low frequency "f" within the frequency area, being equal or less the rated frequency "$f_0$" mentioned above, as is shown in FIG. 7(*b*).

Figure 6:
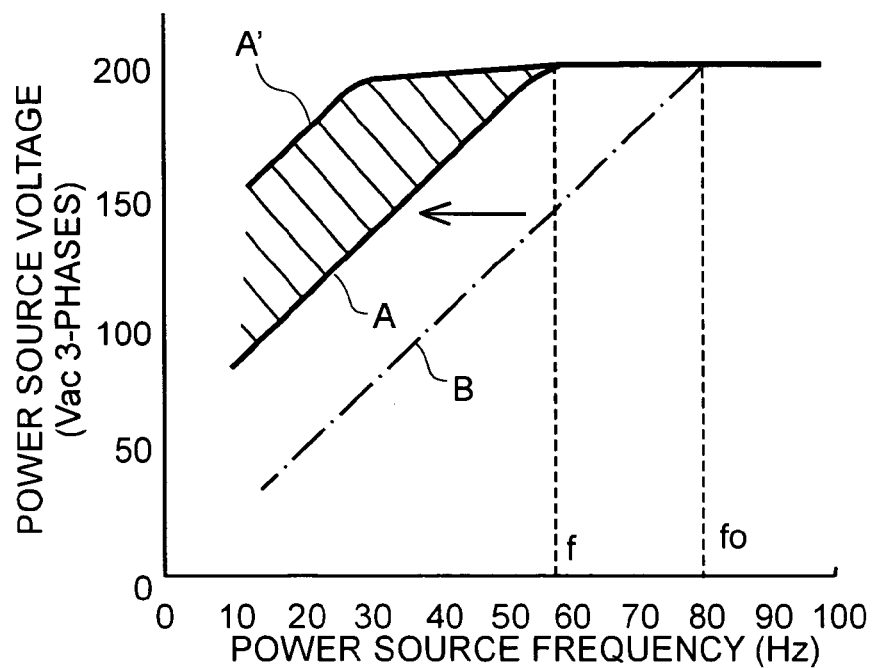
FIGS. 6(a) and 6(b) are graphs for showing a voltage-frequency characteristic curve and a pull-out torque characteristic curve, for explaining other rotation control method of the synchronous motor, according to the present invention.
Figure 6:
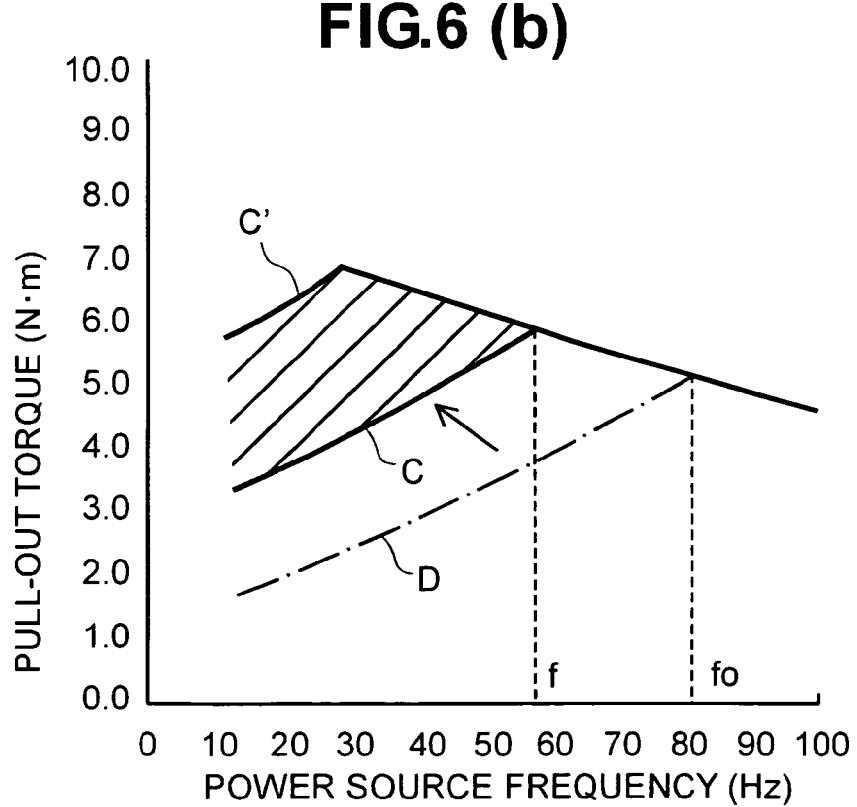
Figure 7:
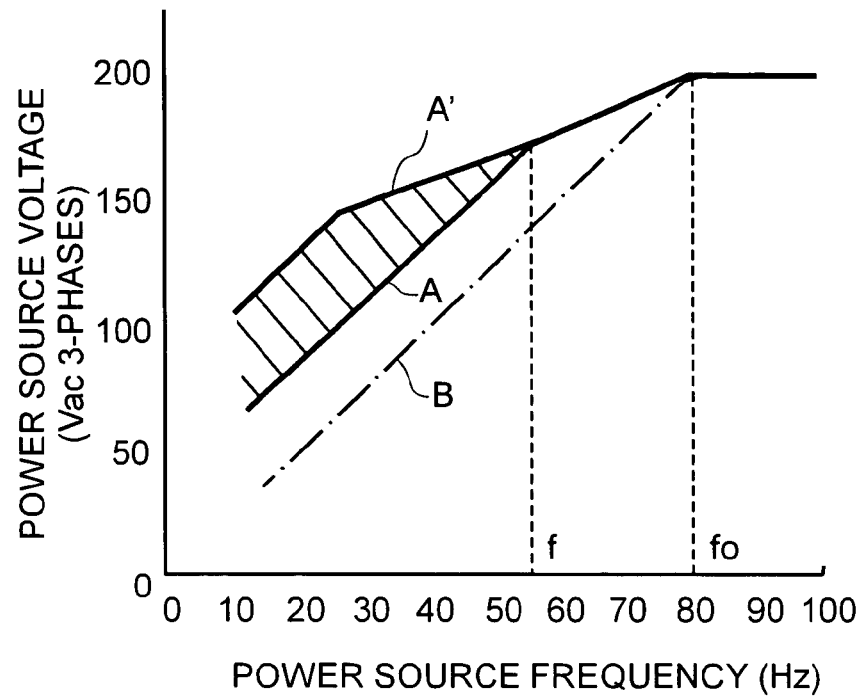
FIGS. 7(a) and 7(b) are graphs for showing a voltage-frequency characteristic curve and a pull-out torque characteristic curve, for explaining further other rotation control method of the synchronous motor, according to the present invention.
Figure 7:
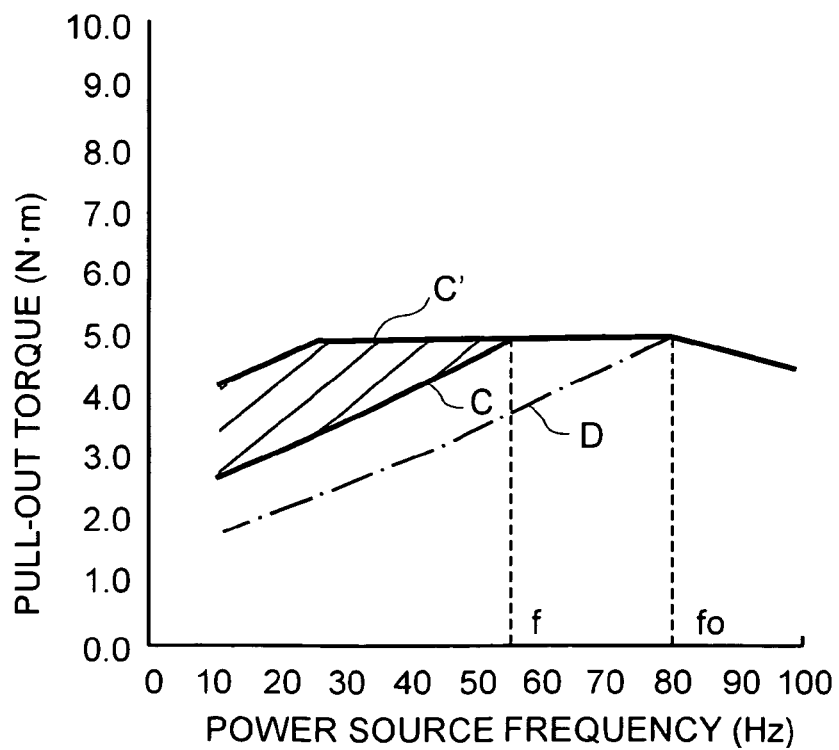

However, with the examples shown in the FIGS. 6(*a*) and 6(*b*) and 7(*a*) and 7(*b*) mentioned above, it is possible to generate the pull-out torque, being equal to the rated pull-out torque or greater than that, until reaching up to the desired low frequency "$f_0$", being equal or less than that including the rated frequency "$f_0$" therein. Although this desired low frequency "f" may be determined, appropriately, depending upon the load or the like of the synchronous motor, however in general, it is preferable to set up or determine the ratio "r", which will be presented by the following equation; i.e., occupying within the total area, in which the frequency is equal or less than the rated frequency "$f_0$", comes to be, such as, around 20% or more than that (up to 100%), for example.

$r=(f_0-f_0)/f_0$

Figure 8:
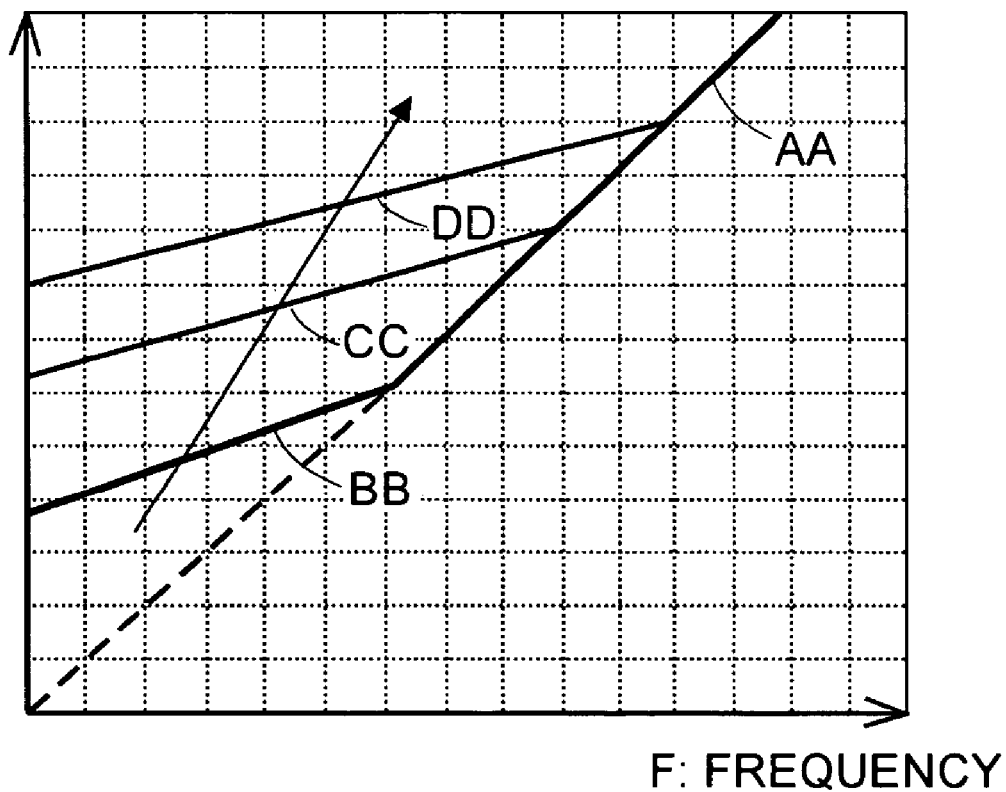
FIG. 8 is a graph for showing a voltage-frequency characteristic curve, for explaining the rotation control method of further other synchronous motor, according to the present invention.

In addition thereto, according to the present invention, as is shown in FIG. 8 attached herewith, for example, comparing to the characteristic curve "AA", increasing up to when it reaches to a predetermined rated voltage, accompanying with an increase of the frequency, it is also possible to apply a method of driving the synchronous motor in accordance with the characteristic curves "BB", "CC" or "DD", within the area where the frequency is equal or less than the rated frequency. However, in this instance, it is also possible to obtain the sufficient pull-out torque within a wide range or area of the frequency of electric power source, through setting up or combining the characteristic curves, appropriately, each being different in the inclination angle thereof, and in other words, it is possible to obtain a stable rotation speed characteristic within the wide area of the rotation speed, but without step-out of the motor.

On the other hand, as was mentioned above, it was acknowledged or recognized that, within the such the three-phases synchronous motor as was mentioned above, so-called the step-out phenomenon will occurs, easily, but it should not be taken into the consideration, in general, in the synchronous motor, and in addition thereto, that the so-called step-out phenomenon will occur therein, in particular, when it is accelerated or decelerated, abruptly. Then, hereinafter, explanation will be made about a controller circuit, being provided according to the present invention, for obtaining the stable rotation speed characteristic of the motor, but without the step-out phenomenon, even when conducting such the abrupt accelerating or decelerating thereupon. However, this controller circuit is that applying so-called the inverter circuit therein, and it is for supplying the AC electric power to the three-phases synchronous motor 100, the detailed structure of which was explained in the above, thereby controlling the rotation speed and the output torque thereof.

Figure 9:
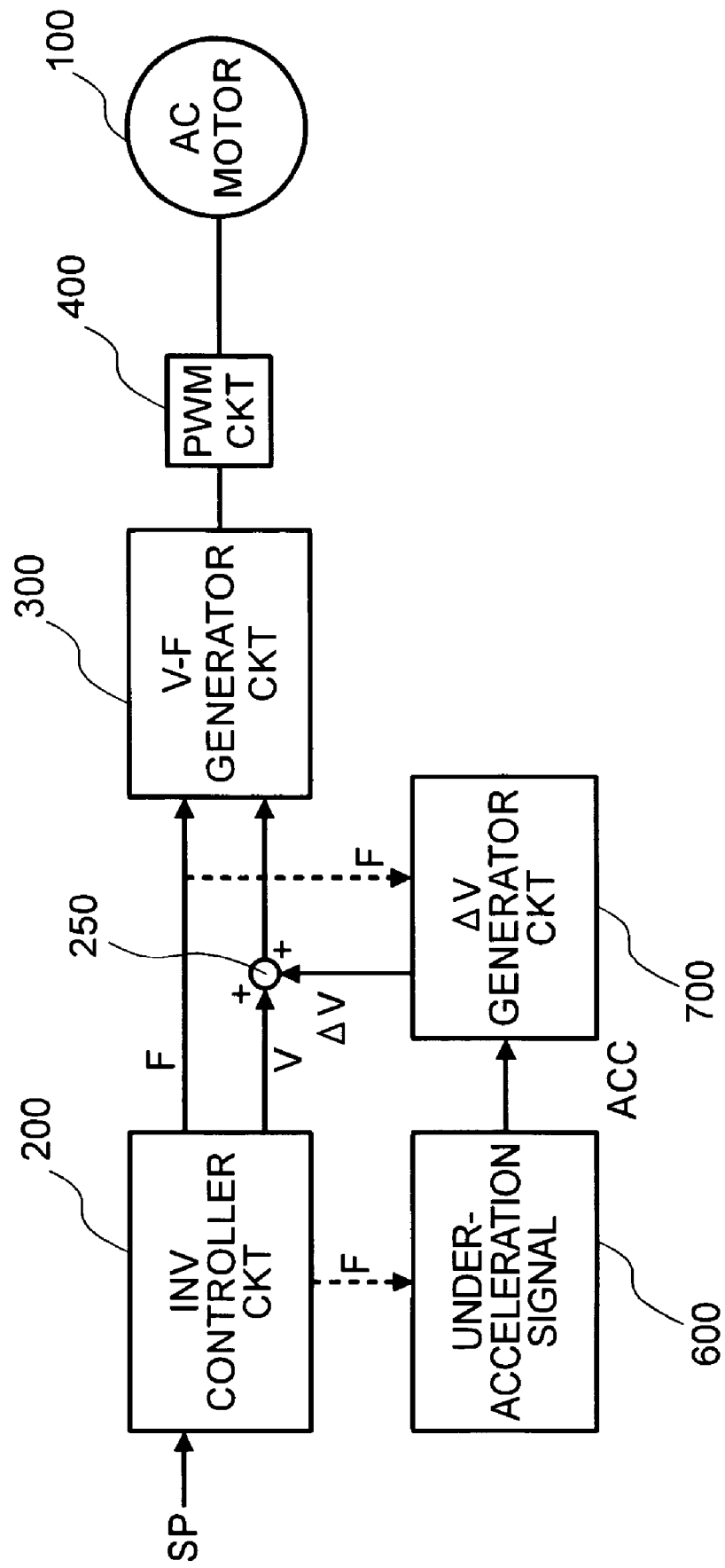
FIG. 9 is a view for showing the circuit diagram of a controller circuit applying an inverter therein, for explaining the control when accelerating and/or decelerating the synchronous motor, according to the present invention.

As will be shown in FIG. 9 attached herewith, the controller circuit is built up with, basically, an INV controller circuit 200, receiving a speed instruction (SP) from an outside as an input, and outputting a frequency signal "F" and a voltage signal "V"; a V-F generator circuit 300, for generating a predetermined V-F (voltage-frequency) characteristic curve upon the basis of the frequency signal "F" and the voltage signal "V" from the INV controller circuit 200; and a PWM (Pulse With Modulation) circuit 400, for supplying the three-phases synchronous motor 100 mentioned above, with AC electric power having the predetermined frequency and the predetermined voltage, upon the basis of the output from the V-F generator circuit 300 (i.e., the V-F characteristic curve).

Further, in the controller circuit, there is provided an adder 250 between the INV controller circuit 200 and the V-F generator circuit 300, and further is provided an under-acceleration signal generator circuit 600, for detecting that the three-phases synchronous motor 100 is in the condition of acceleration thereof, and thereby outputting a signal (i.e., an under-acceleration signal) "ACC" indicating thereof, and a ΔV generator circuit 700 for inputting the under-acceleration signal "ACC" and thereby generating a ΔV signal, as a signal indicative of addition onto the voltage. And, at one of the two inputs of the adder 250 is inputted the output "V" from the INV controller circuit 200, while at the other thereof is inputted the output of the ΔV generator circuit 700; i.e., the ΔV mentioned above. Also, an output of the adder 250 (i.e., "V+ΔV") is inputted into the V-F generator circuit 300. Also, as is shown by a broken line, a portion of the frequency signal "F", as being the output of the V-F generator circuit 300, it is inputted into the under-acceleration signal generator circuit 600, for detecting that the motor is in the condition of acceleration, and thereby outputting the under-acceleration signal therefrom.

Figure 10:
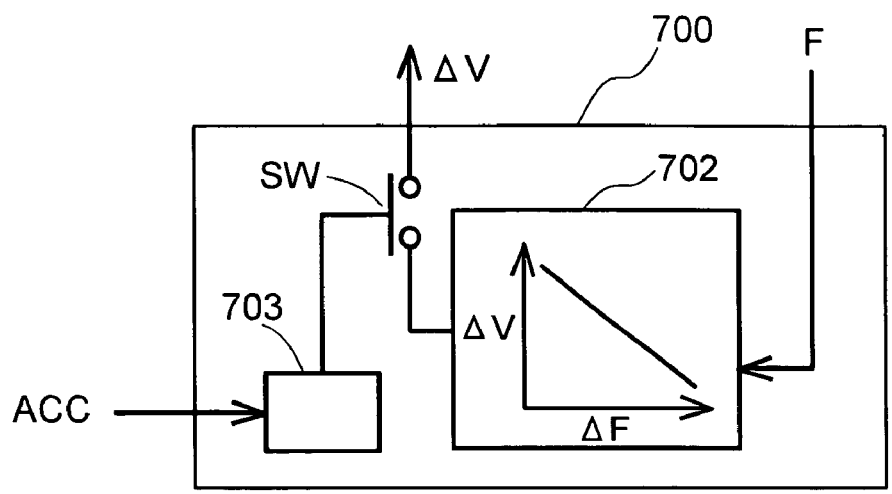
FIG. 10 is a circuit diagram for showing details of an inside of a ΔV generator circuit in the controller circuit shown in the above FIG. 9.
Figure 11:
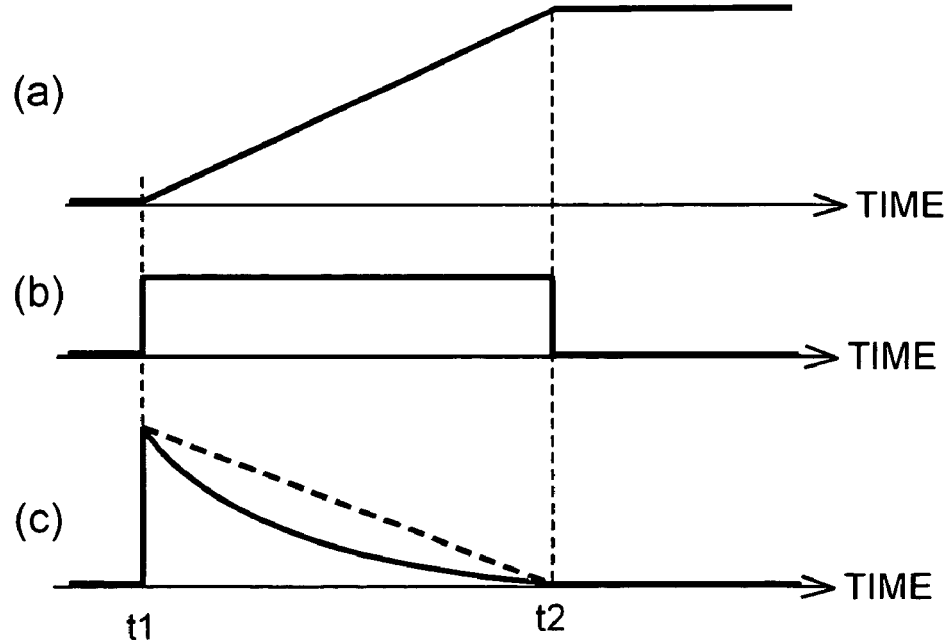
FIG. 11 is a view for showing signal-waveforms for showing the driving operation within the controller circuit shown in the above FIG. 9.

The more details will be shown in FIG. 10 attached herewith, about the controller circuit, though the details of which was explained in the above, in particular, of the ΔV generator circuit 700, and in addition thereto, there is shown a diagram in FIG. 11 attached herewith, showing signal waveforms therein, for explanting the control operation thereof.

First of all, within the ΔV generator circuit 700, as is shown in FIG. 10, there is provided so-called the function generator 702, receiving the frequency signal "F" from the INV controller circuit 200 therein as an input, and thereby generating the ΔV signal upon the basis of a predetermined function set in advance (for example, a reverse proportion and so on). The output signal thereof, i.e., the ΔV signal, is outputted to the adder 250 through a switching element SW. On the other hand, opening/closing of the switching element SW is controlled through an opening/closing controller circuit 703. Further, the function generator 702 mentioned above can be built up with, for example, memorizing the predetermined function into a memory, such as, a ROM, or the like, in the form of a table.

Next, by referring to FIG. 11 attached herewith, explanation will be given about the operation within the controller circuit, when it accelerates the motor, abruptly. However, herein, the operation will be explained in the case where the speed instruction SP, which is inputted from an outside into the INV controller circuit 200, goes up from SP1 to SP2 during a time period from t1 to t2.

Accompanying with an increase of the speed instruction SP, the INV controller circuit 200 (see the FIG. 9 mentioned above) outputs the frequency signal "F" and the voltage signal "V" upon the basis of the predetermined voltage-frequency characteristic. The frequency signal "F" at that time is shown in FIG. 11(*a*). Then, the under-acceleration signal generator circuit 600 mentioned above catches an increase of the frequency signal "F" (through differentiation of the frequency signal "F", for example), and it generates the under-acceleration signal ACC. Thus, as is shown in FIG. 11(*b*), the under-acceleration signal ACC is changed from an "OFF" condition (i.e., a low level) into an "ON" condition (i.e., a high level) when the circuit detects that the motor is under the condition of acceleration.

Following to the above, accompanying with the change of the under-acceleration signal "ACC"; i.e., from the "OFF" condition (the low level) into the "ON" condition (the high level), then the switching element SW is closed due to the function of the opening/closing controller circuit 703 of the ΔV generator circuit 700, and therefore the ΔV signal generated from the function generator 702 passes through the switching element SW, so as to be outputted to the adder 250. The ΔV signal generated from the function generator 702 is shown in FIG. 11(*c*). Further, the ΔV signal generated from the function generator 702 goes down along with a predetermined curve (i.e., being determined with the function of the function generator 702 mentioned above), as is shown by a solid line, for example, or it may goes down in a manner of a straight-line at a predetermined inclination, as is shown by a broken line. As a result thereof, the value of the AC voltages to be supplied into the three-phases synchronous motor 100 rises up; i.e., it increases the torque output of the motor during the acceleration thereof. Further, though not shown in the figure, also when decelerating the three-phases synchronous motor abruptly, the torque output of the motor can be increased, within increasing the value of the AC voltages in the similar manner to that mentioned above, thereby to protect the motor from the step-out.

Figure 12:
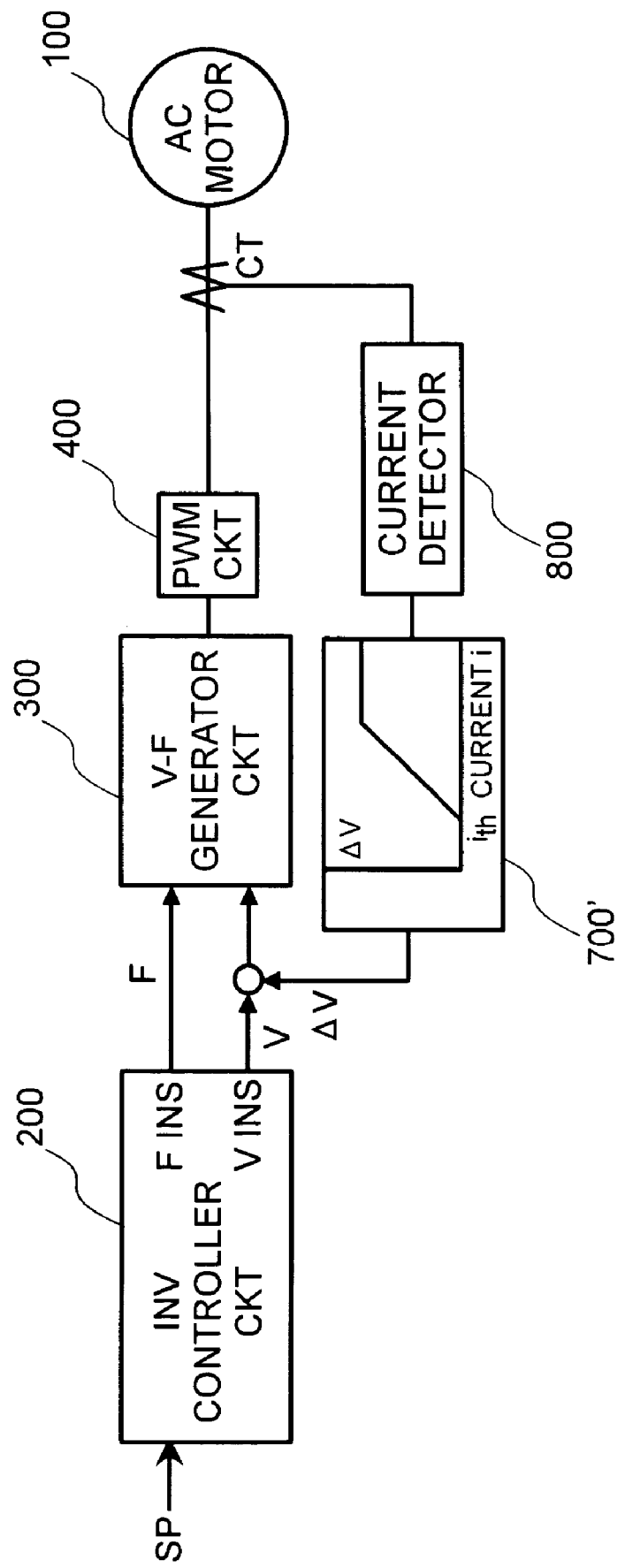
FIG. 12 is a view for showing the circuit diagram of the controller circuit using the inverter therein, for explaining the control for preventing the synchronous motor from stepping-out, according to the present invention.

Further, in FIG. 12 attached herewith, there is shown a variation of the controller circuit for protecting the three-phases synchronous motor from the step-out phenomenon, which will easily occur, in particular, when it is rotationally driven through the inverter apparatus. However, basically, this variation is also built up with, basically, the INV controller circuit 200 for inputting the speed instruction (SP) from an outside and outputting the frequency signal "F" and the voltage signal "V", the V-F generator circuit 300 for generating the predetermined V-F (voltage-frequency) characteristic curve upon the basis f the frequency signal "F" and the voltage signal "V" from the INV controller circuit 200, and the PWM (Pulse With Modulation) circuit 400 for supplying the three-phases synchronous motor 100 with AC electric power, having a predetermined frequency and a predetermined voltage, upon the basis of the output from the V-F generator circuit 300 (i.e., the V-F characteristic curve).

However, in this variation, as is apparent from the figure, current flowing into the three-phases synchronous motor 100 is detected by means of a current detector 800, applying therein, such as, a current transformer (CT), for example, while in a $\Delta V$ generator circuit 700', receiving the current "i" detected as an input, generates the signal $\Delta V$ upon the basis of the predetermined function. Namely, as is apparent from the figure, when the detected current "i" exceeds a predetermined threshold value "$i_{th}$", this $\Delta V$ generator circuit 700' generates the $\Delta V$, being in proportional to that current "i" detected, up to a predetermined current value, however it generates the signal $\Delta V$ of a constant when the detected current exceeds the predetermined current value mentioned above.

Further, in the similar manner as the controller circuit mentioned above, the signal $\Delta V$ generated is inputted into the other input terminal of the adder 250, to be added to the output "V" from the INV controller circuit 200, thereby increasing the torque output of the motor through rising up the AC voltage value to be supplied thereto, when accelerating or decelerating the three-phases synchronous motor abruptly, so as to protect the motor from the step-out phenomenon. Also, in the similar manner to the function generator 702 mentioned above, it is apparent that the $\Delta V$ generator circuit 700' can be built up with, for example, memorizing the predetermined function into a memory, such as, a ROM, or the like, in the form of a table.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A rotation control method of a synchronous motor, said motor comprising:

a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further AC voltages having a predetermined voltage-frequency characteristic is supplied to AC windings wound around the poles of said stator, and the AC voltages supplied from said inverter is so determined in the voltage-frequency characteristic thereof, at least within a part of frequency band equal or less than a predetermined rated frequency, a pull-out torque of said synchronous motor is equal to or greater that a rated pull-out torque at said predetermined rated frequency.

2. The rotation control method of a synchronous motor, as described in the claim 1, wherein the voltage-frequency characteristic of the AC voltages supplied from said inverter is so setup that, the frequency band where said pull-out torque equal is equal or greater than the rated pull-out torque at said rated frequency occupies an area, being equal or greater than 20%, at least, on a total area of frequency, being lower than said rated frequency, including said rated frequency therein.

3. The rotation control method of a synchronous motor, as described in the claim 1, wherein the voltage-frequency characteristic of the AC voltages supplied from said inverter is, further, in proportion between said voltage and said frequency thereof, within the frequency band being equal or less than the predetermined rated frequency.

4. The rotation control method of a synchronous motor, as described in the claim 1, wherein the teeth portions formed on the surface of said rotor of said synchronous motor are skewed.

5. The rotation control method of a synchronous motor, as described in the claim 1, wherein the teeth portions formed on the surface of said rotor of said synchronous motor are from 36 to 200 in numbers thereof.

6. The rotation control method of a synchronous motor, as described in the claim 1, wherein said synchronous motor is a three(3)-phases synchronous motor.

7. A rotation control method of a synchronous motor, said motor comprising:

a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further AC voltages having a predetermined voltage-frequency characteristic is supplied to AC windings wound around the poles of said stator, and the AC voltages supplied from said inverter is increased in voltage thereof when accelerating or decelerating said synchronous motor.

8. The rotation control method of a synchronous motor, as described in the claim 7, wherein the accelerating or decelerating of said synchronous motor is detected upon basis of changing of the frequency in said inverter.

9. The rotation control method of a synchronous motor, as described in the claim 7, wherein the teeth portions formed on the surface of said rotor of said synchronous motor are skewed.

10. The rotation control method of a synchronous motor, as described in the claim 7, wherein the teeth portions formed on the surface of said rotor of said synchronous motor are from 36 to 200 in numbers thereof.

11. The rotation control method of a synchronous motor, as described in the claim 7, wherein said synchronous motor is a three(3)-phases synchronous motor.

12. A rotation control method of a synchronous motor, said motor comprising:
a stator having AC windings thereround; and
a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further AC voltages having a predetermined voltage-frequency characteristic is supplied to AC windings wound around the poles of said stator, and
the AC voltages supplied from said inverter is increased in voltage thereof when increasing current supplied to synchronous motor.

13. The rotation control method of a synchronous motor, as described in the claim 12, wherein the teeth portions formed on the surface of said rotor of said synchronous motor are skewed.

14. The rotation control method of a synchronous motor, as described in the claim 12, wherein the teeth portions formed on the surface of said rotor of said synchronous motor are from 36 to 200 in numbers thereof.

15. The rotation control method of a synchronous motor, as described in the claim 12, wherein said synchronous motor is a three(3)-phases synchronous motor.

16. A synchronous motor, comprising:
a stator having AC windings thereround; and
a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further comprising:
an inverter for supplying AC voltages to AC windings wound around the poles of said stator, wherein
the AC voltages supplied from said inverter is so determined in the voltage-frequency characteristic thereof, at least within a part of frequency band equal or less than a predetermined rated frequency, a pull-out torque of said synchronous motor is equal to or greater that a rated pull-out torque at said predetermined rated frequency.

17. The synchronous motor, as described in the claim 16, wherein the teeth portions formed on the surface of said rotor of said synchronous motor are skewed.

18. The synchronous motor, as described in the claim 16, wherein the teeth portions formed on the surface of said rotor of said synchronous motor are from 36 to 200 in numbers thereof.

19. The synchronous motor, as described in the claim 16, wherein said synchronous motor is a three(3)-phases synchronous motor.

20. A synchronous motor, comprising:
a stator having AC windings thereround; and
a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further comprising:
an inverter for supplying AC voltages to AC windings wound around the poles of said stator, wherein
the AC voltages supplied from said inverter is increased in voltage thereof when accelerating or decelerating said synchronous motor.

21. The synchronous motor, as described in the claim 20, wherein the teeth portions formed on the surface of said rotor of said synchronous motor are skewed.

22. The synchronous motor, as described in the claim 20, wherein the teeth portions formed on the surface of said rotor of said synchronous motor are from 36 to 200 in numbers thereof.

23. The synchronous motor, as described in the claim 20, wherein said synchronous motor is a three(3)-phases synchronous motor.

24. A synchronous motor, comprising:
a stator having AC windings thereround; and
a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and further comprising:
an inverter for supplying AC voltages to AC windings wound around the poles of said stator, wherein
the AC voltages supplied from said inverter is increased in voltage thereof when increasing current supplied to synchronous motor.

25. The synchronous motor, as described in the claim 24, wherein the teeth portions formed on the surface of said rotor of said synchronous motor are skewed.

26. The synchronous motor, as described in the claim 24, wherein the teeth portions formed on the surface of said rotor of said synchronous motor are from 36 to 200 in numbers thereof.

27. The synchronous motor, as described in the claim 24, wherein said synchronous motor is a three(3)-phases synchronous motor.

28. An inverter for use of the synchronous motor, for supplying AC voltages to poles of a stator within said synchronous motor, said motor comprising:
a stator having AC windings thereround; and
a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and within said inverter, the AC voltages supplied from said inverter is so determined in the voltage-frequency characteristic thereof, at least within a part of frequency band equal or less than a predetermined rated frequency, a pull-out torque of said synchronous motor is equal to or greater that a rated pull-out torque at said predetermined rated frequency.

29. The inverter for use of the synchronous motor, as described in the claim 28, wherein the voltage-frequency characteristic of the AC voltages supplied from said inverter is so set up that, the frequency band where said pull-out torque equal is equal or greater than the rated pull-out torque at said rated frequency occupies an area, being equal or greater than 20%, at least, on a total area of frequency, being lower than said rated frequency, including said rated frequency therein.

30. The inverter for use of the synchronous motor, as described in the claim 28, wherein the voltage-frequency characteristic of the AC voltages supplied from said inverter is, further, in proportion between said voltage and said frequency thereof, within the frequency band being equal or less than the predetermined rated frequency.

31. The inverter for use of the synchronous motor, as described in the claim 28, wherein the teeth portions formed on the surface of said rotor of said synchronous motor are skewed.

32. The inverter for use of the synchronous motor, as described in the claim 28, wherein the teeth portions formed on the surface of said rotor of said synchronous motor are from 36 to 200 in numbers thereof.

33. The inverter for use of the synchronous motor, as described in the claim 28, wherein said synchronous motor is a three(3)-phases synchronous motor.

34. An inverter for use of the synchronous motor, for supplying AC voltages to poles of a stator within said synchronous motor, said motor comprising:

a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and within said inverter, the AC voltages supplied from said inverter is increased in voltage thereof when accelerating or decelerating said synchronous motor.

35. The inverter for use of the synchronous motor, as described in the claim 34, wherein the teeth portions formed on the surface of said rotor of said synchronous motor are skewed.

36. The inverter for use of the synchronous motor, as described in the claim 34, wherein the teeth portions formed on the surface of said rotor of said synchronous motor are from 36 to 200 in numbers thereof.

37. The inverter for use of the synchronous motor, as described in the claim 34, wherein said synchronous motor is a three(3)-phases synchronous motor.

38. An inverter for use of the synchronous motor, for supplying AC voltages to poles of a stator within said synchronous motor, said motor comprising:

a stator having AC windings thereround; and a rotor, being mounted within said stator, rotatably, wherein on an each surface, opposing to said rotor, of poles building up said stator, are formed plural numbers of teeth portions, and on a surface of said rotor, being made of permanent magnet, opposing to said poles of said stator, are also formed plural numbers of teeth portions, with a width being nearly equal to that of said teeth portion in a circumference direction thereof, and within said inverter, the AC voltages supplied from said inverter is increased in voltage thereof when increasing current supplied to synchronous motor.

39. The inverter for use of the synchronous motor, as described in the claim 38, wherein the teeth portions formed on the surface of said rotor of said synchronous motor are skewed.

40. The inverter for use of the synchronous motor, as described in the claim 38, wherein the teeth portions formed on the surface of said rotor of said synchronous motor are from 36 to 200 in numbers thereof.

41. The inverter for use of the synchronous motor, as described in the claim 38, wherein said synchronous motor is a three(3)-phases synchronous motor.

* * * * *